C. W. FOX & J. L. CYPHER.
NUT LOCK.
APPLICATION FILED SEPT. 30, 1914.
1,144,833.
Patented June 29, 1915.
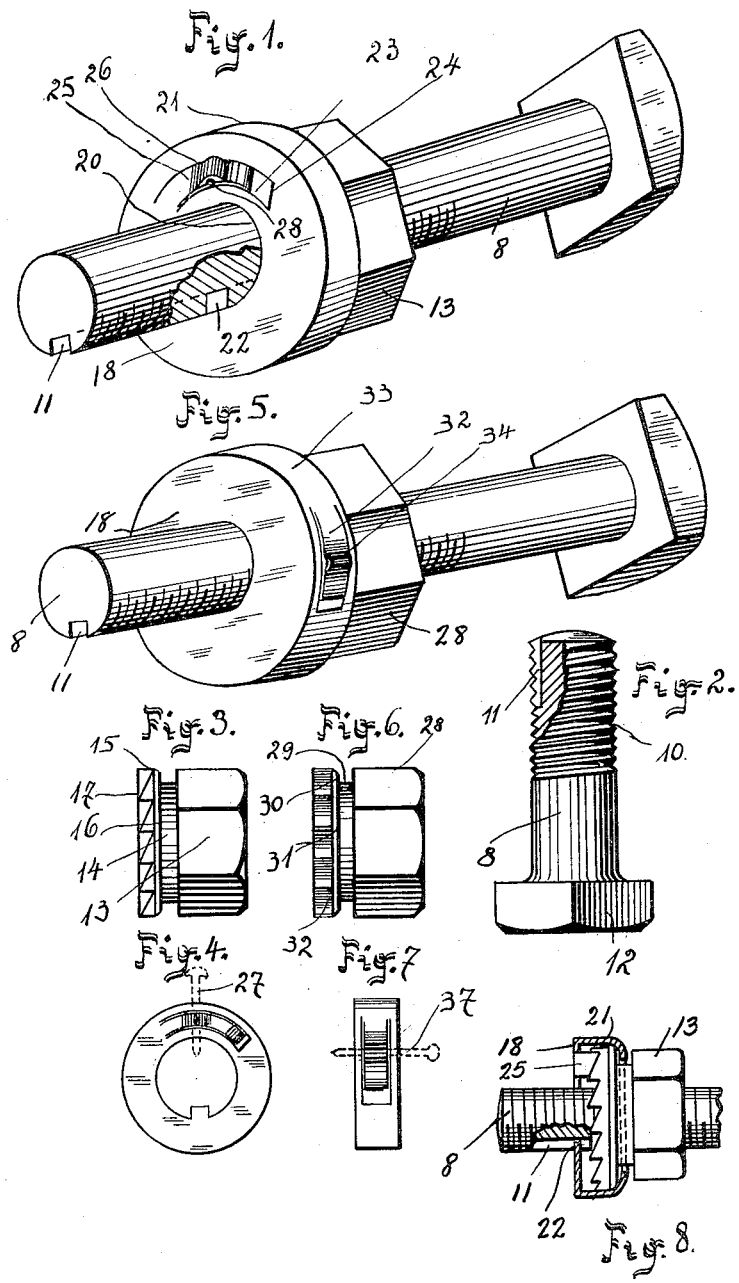

UNITED STATES PATENT OFFICE.

CHARLES W. FOX AND JAMES L. CYPHER, OF CONNELLSVILLE, PENNSYLVANIA.

NUT-LOCK.

1,144,833.  Specification of Letters Patent. Patented June 29, 1915.

Application filed September 30, 1914. Serial No. 864,312.

*To all whom it may concern:*

Be it known that we, CHARLES W. Fox and JAMES L. CYPHER, citizens of the United States of America, residing at Connellsville, in the county of Fayette and State of Pennsylvania, have invented certain new and useful Improvements in Nut-Locks, of which the following is a specification, reference being had therein to the accompanying drawing.

This invention relates to nut locks and has for its object to provide a device of such class, in a manner as hereinafter set forth, with means to arrest back rotation of a nut thereby preventing the articles clamped by a nut from becoming loose and said means capable, when the occasion requires, for being released from a nut, so that the nut can be removed.
Further objects of the invention are to provide a nut lock, in a manner as hereinafter set forth, having means to prevent a nut from rotating relatively to a bolt and the bolt from rotating relatively to the nut, said means having provisions whereby it can be conveniently released from locking position and maintained in such position to enable the efficient removal of a nut from a bolt.
Further objects of the invention are to provide a nut lock which is simple in its construction and arrangement, strong, durable, thoroughly efficient in its use, conveniently applied, and inexpensive to manufacture.
With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claim hereunto appended.
In the drawings wherein like reference characters denote corresponding parts throughout the several views, Figure 1 is a perspective view of a nut lock in accordance with our invention. Fig. 2 is an elevation, broken away, of a bolt. Fig. 3 is an elevation of a form of nut employed in form shown in Fig. 1. Fig. 4 is an end view illustrating a locking member released to permit of the removal of a nut. Fig. 5 is a per-
spective view of a modified form of a nut lock. Fig. 6 is an elevation of a form of nut employed in the modified form. Fig. 7 is an elevation illustrating the locking member, employed in the construction shown in Fig. 5 in a released position to enable the removal of the nut. Fig. 8 is a sectional view of a portion of the bolt and locking member in assembled position, illustrating the manner of holding the locking member in position on the nut.

Referring to the drawing the bolt includes a shank 8 having a threaded portion 10 which is formed with a longitudinal groove 11. The shank 8 is provided with a head 12.

Referring to Figs. 1, 3 and 4, 13 denotes a nut which is adapted to have threaded engagement with the shank 8 of the bolt and formed integral with the outer face of the nut 13 is an extension 14, of less diameter than the diameter of the nut 13. Carried by the extension 14 is a collar 15, which is of greater diameter than the extension 14, thereby providing a ledge 16.

The collar 15 has its outer face provided with ratchet teeth 17. The collar 15, as well as the extension 14, has interior threads which form a continuation of the threads of the nut 13. Associated with the collar 15 is a locking member consisting of a disk 18, having a centrally disposed opening 19 for the passage of a bolt and said disk 18 has its inner end provided with a lug 20, which engages in the groove 11, whereby rotation of the disk 18, with respect to the bolt is prevented. The disk 18 is formed with an annular flange 21, which incloses the collar 15 and which is bent to engage in the ledge 16 as shown in Fig. 8 whereby the disk is maintained in position upon the collar to prevent rotation of the nut, relatively to the bolt, the disk 18 is slitted as at 22, 23, 24, and the material freed by said slits is bent to provide an inwardly extending tongue 25, which engages the teeth 17 of the collar 15 whereby rotative movement backwardly of the nut is arrested. The tongue 25 will engage the teeth 17 until it is removed therefrom and to provide for the removal of the tongue 25 out of engagement with the teeth 17, said tongue 25 is offset as at 26, to provide a passage 28, and through which is adapted to extend a nail, or other sharp instrument as indicated at 27, whereby the tongue 25 will be shifted out of engagement with the teeth of the collar 15 and the nut can then be screwed off the bolt.

In the form shown in Figs. 5, 6 and 7, the nut is indicated at 28, and the extension at 29, the collar at 30 and the ledge at 31. The collar 30 has peripheral teeth 32. The difference between the form of locking member employed in Fig. 5 and that shown in Fig. 1, is that the tongue, which is indicated at 32ª, is formed in a flange 33, in lieu of the disk 18. The tongue 32 is offset as at 34 to provide a passage 36 and said tongue 32 is adapted to engage the teeth 32 of the collar 30. The tongue 32 is released from the teeth 32 by a nail or other sharp instrument 37 whereby the nut can be removed from the bolt, otherwise as stated the construction of the locking member shown in Fig. 5 is the same as that shown in Fig. 1, it being noted that the edge of the flange 33 is bent as shown in Fig. 8 to retain the same in position on the nut.

What we claim is:—

A nut lock comprising the combination with a bolt having a longitudinally extending groove, of a nut mounted upon said bolt and having a toothed collar on its outer face, said collar providing a ledge, and a locking member mounted upon the bolt and engaging in said groove and provided with means engaging the teeth of the collar and furthermore over-lapping and engaging the ledge.

In testimony whereof we affix our signatures in the presence of two witnesses.

CHARLES W. FOX.
JAMES L. CYPHER.

Witnesses:
JAMES L. HAINES,
JACOB B. SLONECKER.

Copies of this patent may be obtained for five cents each, by addressing the "Commissioner of Patents, Washington, D. C."